United States Patent
Pendleton et al.

(10) Patent No.: US 9,467,361 B2
(45) Date of Patent: Oct. 11, 2016

(54) BANDWIDTH UTILIZATION MONITORING FOR A COMMUNICATION SYSTEM

(75) Inventors: Amy S. Pendleton, Cedar Park, TX (US); Pramod Madabhushi, Austin, TX (US)

(73) Assignee: Shoretel, Inc., Sunnyvale, CA (US)

( * ) Notice: Subject to any disclaimer, the term of this patent is extended or adjusted under 35 U.S.C. 154(b) by 232 days.

(21) Appl. No.: 13/331,412

(22) Filed: Dec. 20, 2011

(65) Prior Publication Data
US 2013/0155882 A1    Jun. 20, 2013

(51) Int. Cl.
*H04L 12/26*    (2006.01)

(52) U.S. Cl.
CPC .. *H04L 43/0882* (2013.01); *H04M 2215/0164* (2013.01)

(58) Field of Classification Search
None
See application file for complete search history.

(56) References Cited

U.S. PATENT DOCUMENTS

| | | | | |
|---|---|---|---|---|
| 5,479,613 | A * | 12/1995 | Geyer et al. | 709/224 |
| 5,673,253 | A * | 9/1997 | Shaffer | 370/229 |
| 6,473,793 | B1 * | 10/2002 | Dillon et al. | 709/223 |
| 7,729,268 | B2 | 6/2010 | Matta et al. | |
| 7,873,074 | B1 | 1/2011 | Boland | |
| 7,886,054 | B1 | 2/2011 | Nag et al. | |
| 8,000,240 | B2 * | 8/2011 | DelRegno et al. | 370/232 |
| 8,724,461 | B2 * | 5/2014 | DelRegno et al. | 370/232 |
| 2005/0091392 | A1 | 4/2005 | Gesswein et al. | |
| 2005/0201414 | A1 * | 9/2005 | Awais | H04L 29/06027 370/468 |
| 2006/0077962 | A1 | 4/2006 | Wu et al. | |
| 2007/0118881 | A1 | 5/2007 | Mitchell et al. | |
| 2007/0206505 | A1 | 9/2007 | Forbes | |
| 2008/0037457 | A1 * | 2/2008 | Matsukura | H04B 7/155 370/315 |
| 2008/0219243 | A1 * | 9/2008 | Silverman | H04L 12/2602 370/352 |
| 2008/0275984 | A1 * | 11/2008 | Ullmann et al. | 709/224 |
| 2009/0327499 | A1 | 12/2009 | Strickland et al. | |
| 2010/0157834 | A1 * | 6/2010 | Keromytis et al. | 370/252 |
| 2010/0189129 | A1 * | 7/2010 | Hinosugi et al. | 370/468 |
| 2010/0325551 | A1 * | 12/2010 | Lauwers et al. | 715/736 |
| 2012/0044931 | A1 * | 2/2012 | Harper et al. | 370/352 |

FOREIGN PATENT DOCUMENTS

EP    1906582 A2    4/2008

\* cited by examiner

*Primary Examiner* — Ian N Moore
*Assistant Examiner* — Latresa McCallum
(74) *Attorney, Agent, or Firm* — Tarolli, Sundheim, Covell & Tummino LLP

(57) ABSTRACT

A system to monitor bandwidth can include memory to store session data describing each communication session for at least a portion of a communication system. A bandwidth calculator can access the session data and provide a measure of bandwidth utilization computed based on the accessed session data.

14 Claims, 5 Drawing Sheets

BANDWIDTH UTILIZATION MONITORING FOR A COMMUNICATION SYSTEM

TECHNICAL FIELD

This disclosure relates to communications and, more particularly, to monitoring bandwidth utilization for a communication system.

BACKGROUND

In the context of network communications, bandwidth generally refers to an average rate of data transfer through a communication path. A measure of bandwidth thus can be determined by monitoring the rate at which data flows through the path, such as based on the amount of data through the path over a period of time. A given communication path in a network usually has a maximum available bandwidth sometimes referred to as a bandwidth cap. Accordingly, it is often desirable to understand the bandwidth utilization to help ensure that data integrity is maintained by not exceeding the maximum.

As an example, bandwidth is measured actively by injecting probing traffic into the network and observing the time delay from transmission to receipt. However, such active monitoring of bandwidth disturbs the network by introducing a load into the network. Additionally, active monitoring generally provides a rough estimate of overall bandwidth since the probes are not continuously transmitted throughout the entire network.

SUMMARY

This disclosure relates to communications and, more particularly, to monitoring bandwidth utilization for a communication system.

In one example, a system to monitor bandwidth can include memory to store session data describing each communication session for at least a portion of a communication system. A bandwidth calculator can access the session data and provide a measure of bandwidth utilization computed based on the accessed session data.

As another example, a bandwidth monitor for a communications system can include a graphical user interface programmed to set at least one parameter in response to a user input. A bandwidth calculator is programmed to compute a measure of bandwidth utilization based on session data stored in a data store for a plurality of media sessions and according to the at least one parameter. An output generator can be programmed to generate an output based on the measure of bandwidth utilization.

As yet another example, a method of monitoring bandwidth utilization can include setting parameters corresponding to at least one of a location and a time. The method can also include retrieving session data from a data store based on the parameters that have been set. The session data can be stored in the data store to characterize media stream details for a plurality of media sessions. The method can also include providing an output representing the measure of bandwidth utilization by computing a measure of bandwidth utilization based on the retrieved session data.

DETAILED DESCRIPTION

This disclosure relates to systems and methods for monitoring bandwidth utilization in a communication system. The systems and methods disclosed herein may be utilized to monitor bandwidth usage for any device or service, referred to herein as an endpoint, which can be implemented to communicate one or more media streams. Information describing each communication session that occurs within the communication system can be stored as session data in memory. For each communication session, a record can include fields that store an identification of one or more endpoints involved in the session, duration of the session or information sufficient to calculate the duration, and other information describing how media is communicated for the session. For example, the session data record can store information about the communications format (e.g., a codec, container format) that is utilized for communicating media in the given session. A bandwidth calculator can access the session data and compute a measure of bandwidth utilization based on the accessed session data. The resulting measure of bandwidth utilization can be used, for example, in reporting and providing alert functions.

Figure 1:
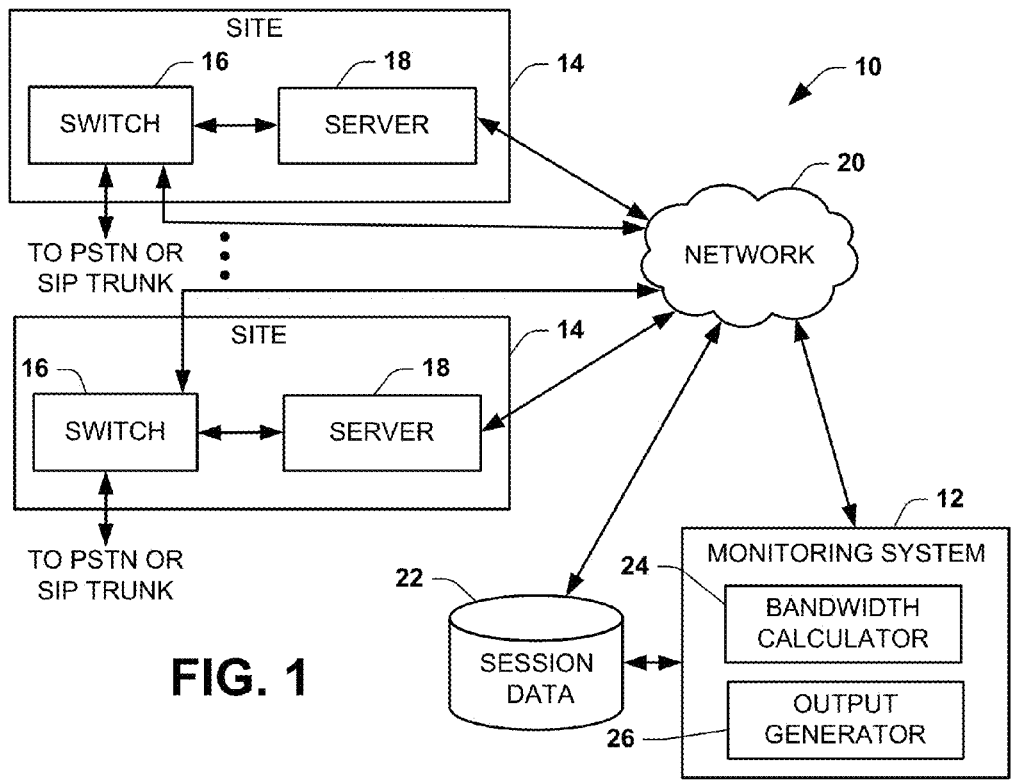
FIG. 1 depicts an example of a communication system implementing a monitoring system.

FIG. 1 depicts an example of a communication system 10 that includes a monitoring system 12. In the example of FIG. 1, the system 10 is demonstrated in the context of a communications system that can include any number of one or more sites 14 that can be located in disparate locations. As used herein, a site can represent a grouping of resources that can be physically separate from each other, it can represent topology-related groupings that are not in physically distinct locations that operate logically as distinct groups or it can represent combinations thereof. Each site 14 can include any number of endpoints (not shown in FIG. 1 for purposes of brevity). An endpoint can correspond to telephone equipment or similar resources (e.g., an analog telephone, an IP Phone, software phone, a video communications device, a video conferencing device or the like). Alternative examples of endpoints can include video conferencing device, media collaboration services (e.g., desktop sharing, instant message) and related devices, a multi point control unit (MCU) a conference bridge, an analog terminal adaptor (ATA), a computer or any other device that can communicate one or more media streams for which it may be desirable to monitor bandwidth usage. Each endpoint may also include a display that is utilized in conjunction with the communication device at such endpoint.

Each of the sites 14 can include one or more switches 16 and a corresponding server 18, such as for providing an integrated enterprise communication system 10. For example, each switch can be configured to handle (e.g., route) media and perform signaling between endpoints in the system 10. The server 18 can be implemented as a computer or other appliance (e.g., having a processor) that is programmed to execute instructions to perform communications related services (e.g., unified communications, messaging, collaboration services, call accounting and the like). While the switch 16 and server 18 are demonstrated as separate blocks, the functionality or at least a portion of such functionality of the switch and server can be integrated in a common block (be it the server or the switch). That is, the functionality performed by the switch 16 and server 18 can be distributed at a given site in different ways, for example, depending on its implementation and/or manufacturer specifications.

The system 10 also includes a network 20 to which each site 14 is connected (e.g., via a network interface—not shown). For example, each switch 16 can be coupled to the network 20 and to a public switch telephone network (PSTN) or SIP trunk service provider. Each switch 16 at each site 14 thus can provide an interface for sessions originating from or terminating at the PSTN or SIP trunk. Additionally, inter-site calls between endpoints at any site 14 can be communicated via the switch through its connection with the network 20. While the example of FIG. 1 demonstrates a single switch 16 at each site 14, it is to be appreciated that a site can include any number of one or more switches depending upon resource requirements. In other examples, one or more sites can include endpoints that are controlled by switches located at another site. The server 18 can also be coupled to the network 20 such as forming part of unified communication system. The local site server 18 may further be coupled to endpoints at such site, such as through a local network (not shown). In other examples, a given site 14 may have multiple servers or it may be implemented without a server.

The server 18 can include memory that stores data and machine-readable instructions. The server 18 also includes the processor that acts as the memory and performs functions and methods according to the instructions stored therein. As one example, the memory can store call manager software for performing various call handling functions as well as application programming interfaces (APIs) to access related functions and methods for use with the system 10. The processor of the server 18 can execute computer readable instructions to interact with the switch 16 such as to manage the switches and to record information based upon their operation.

As disclosed herein, one function of the server 18 is to store the session data for each communication session that flows through a given site 14, such as including through the switch 16. Such session data in the context of telephony is sometimes referred to as call detail record. A call detail record, also known as call data record, thus corresponds to a session data record, such as can be produced by a telephone exchange (e.g., the switch 16, the server 18) or other telecommunications equipment documenting the details of a telephone phone call that passed through the site or a device within the site. A corresponding session record for each session at each site can be stored for the system 10 as session data 22. The session data can be implemented as a single data store or, alternatively, it may be a distributed database for the system 10. Since the signaling and exchange of other control information for a given session can also contribute the bandwidth usage, information about such data that is communicated for the given session can also be stored as part of the session data 22.

The session data 22 thus includes a record for each communication session (e.g., call). Each record includes a set of fields containing values that collectively characterize details for each respective session. The type and detail information stored in each record can vary from system to system according to application requirements. In some examples, the server 18 can store the session data for each communication session (e.g., a call) after the session has been terminated. In other examples, the server 18 can be programmed to create a session record and update the record dynamically during the progress of the session, which record can become permanent after the call has been terminated. In this way, session data 22 can store detailed call records for each communication session which occurs in the enterprise system 10.

By way of example, the system can generate multiple tables for each call session such as by generating different tables for different purposes. Relevant to computing bandwidth the session data 22 can include a media stream data structure (e.g., a table) that logs information about media streams, which information is sufficient for computing bandwidth usage as disclosed herein. The media stream can store information about each side of the stream, including for sessions involving more than one party as well as more than one type of communications media and transfers between different endpoints. There can be more than one record stored as session data for a given session. An example of a table that stores session data for a media stream is shown below in the following table.

| FIELD | DESCRIPTION |
| --- | --- |
| PartyID | An identifier for each party to the call. |
| PartyLocation | A name and/or identifier for the location of each party (e.g., a site name). |
| Network | Field to indicate whether call accessed a WAN. |
| Call_ID | The Call Identification number for the media stream. |
| EncodingType | The method of voice encoding used for the media stream. |
| Encryption Type | The type of encryption (if any) used for secure transmission of content. |
| Network Transport Type | The type of network protocol used for transport of the media stream (e.g., TP0, TP1, TP2, TP3, TP4). |
| PayloadSize | Media payload size in bytes for each media packet. |
| StartTime | Time the media stream began. |
| Duration | Elapsed times of call from beginning to end. |
| DurationSeconds | Elapsed seconds time of call from beginning to end. |
| Total Packets | The number of total packets communicated via the media stream. This can be total packets received by each party. |

The monitoring system 12 can be configured to access the session data 22 and determine bandwidth usage based on such session data. For example, the monitoring system 12 can be implemented as a server that can access the session data directly or via the network 20. As mentioned above, the monitoring system 12 can include a processor and memory programmed with data and executable instructions that can be executed by the processor. Specifically, the monitoring system 12 can include a bandwidth calculator 24 that can compute a measure of bandwidth utilization based on the session data 22.

By way of example, the bandwidth calculator 24 can be programmed to compute a measure of bandwidth according to user programmable parameters. The parameters can include a time parameter and/or location parameter for constraining the session data utilized in a given bandwidth calculation. For instance, the bandwidth calculator 24 can utilize each of the parameters to construct an appropriate query for a session data 22 such that corresponding records are accessed and to retrieve corresponding data for computing the bandwidth utilization.

As a further example, a designated time period can be utilized to filter the session data 22 and access records within the designated time period. In some examples, the timing parameter can correspond to a real time (or near real time), such that the bandwidth calculator computes a real time bandwidth utilization based on corresponding session data. In other examples, the time period can be a historical time period which can be utilized for analyzing historical trends in bandwidth utilization. Additionally, the bandwidth calculator 24 can be programmed to compute the measure of bandwidth utilization for a selected location such as can include the entire enterprise system 10, a selected site 14, a given switch 16, an endpoint or other device within the system 10. The granularity of the location parameters that can be specified for bandwidth calculations may depend on and thus be limited only by the level of granularity of the available session data 22.

For example, the bandwidth calculator 24 can be programmed with data or to access data identifying bandwidth information (e.g., a bandwidth mapping table) for each of a plurality of formats (e.g., container formats, codecs for audio, video or other data) that may be implemented within the system 10. Thus, by knowing the bandwidth (e.g., in the number of bytes per packet for a given codec) and the number of packets (e.g., identified by Encoding Type, Encryption Type and Transport Type fields of the media stream table), the bandwidth calculator 24 can compute bandwidth usage for a given time period. The bandwidth calculator 24 can perform such computation by multiplying the resulting bandwidth (e.g., number of bytes per second) times the duration for each respective session that is active during the time period and was within the specified location parameter. The computed bandwidth utilization for each session (if more than one session exists within the constraints of the time/location parameters) can be summed to provide an aggregate indication of bandwidth utilization. In some examples, the functionality of the monitoring system 12 can be distributed throughout the system 10, and the results of monitoring can be aggregated together to provide the indication of bandwidth usage. The manner in which the different sessions are aggregated (e.g., based on location and time) can be selected by the user.

The monitoring system 12 can also include an output generator 26 that is programmed to output the computed measure of bandwidth utilization to a display or other type of output device. For example, the output generator 26 can provide a graphical output and/or text based output that can be used by an administrator for monitoring bandwidth utilization for one or more locations and selected times. The output generator 26 can also provide the bandwidth utilization output to another application (e.g., via a corresponding application programming interface), such as can be utilized in conjunction with bandwidth management and resource utilization for the enterprise system 10.

Figure 2:
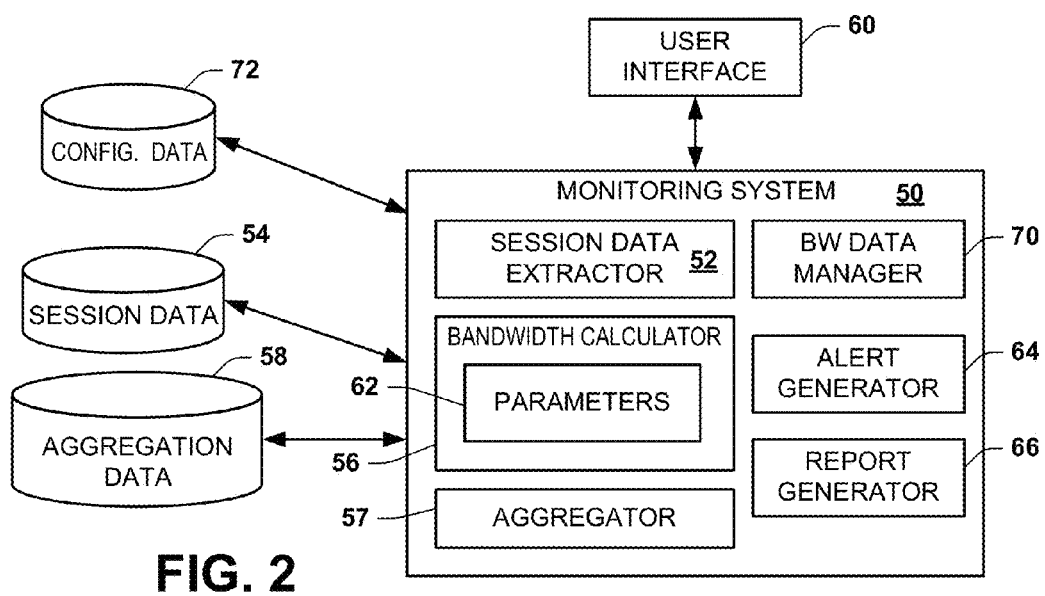
FIG. 2 depicts an example of a monitoring system that can be used to measure bandwidth utilization.

FIG. 2 depicts another example of a monitoring system 50 that can be implemented within an enterprise telephony system (e.g., the system 10 of FIG. 1). The monitoring system 50 can be implemented as a service such as computer executable instructions executed by a processor or stored in a computer readable medium. In the example of FIG. 2, the monitoring system 50 can include a session data extractor 52 that is programmed to access session data 54. The session data 54 can include call detail records for all media communication sessions that occur within an enterprise telephony system, such as disclosed herein. The session data extractor 52 can access the session data 54 and extract selected portions of data relevant to computing bandwidth usage. As an example, the session data extractor 52 can be programmed to pull session data continuously in real time or periodically. For instance, each time the data extractor 52 accesses the session data 54 it can extract new records that have been updated since the previous extraction.

The monitoring system 50 can employ a bandwidth calculator 56 to compute bandwidth utilization for each session. The monitoring system 50 can include an aggregator 57 programmed to store the updated bandwidth computations as well as relevant location and timing information in a separate data store, demonstrated as aggregation data 58. As an example, the aggregation data 58 can include the calculated bandwidth utilization associated timings, such as start and end time and a calculation of the bandwidth during such time periods. Additionally, or alternatively, the relevant data used to compute bandwidth utilization can be stored in the aggregation store. By storing the bandwidth utilization information as aggregation data 58 separate from the session data 54, requests to compute bandwidth utilization for a given period and/or location can be facilitated.

As a further example, the system 50 can be implemented in a distributed manner that can include multiple monitoring systems that can collect and analyze session data for different locations. The different locations can be different geographic locations and/or correspond to different parts of an organizational enterprise that may or may not be at spatially different locations. The locations that can be accessed by the monitoring system can vary depending on authorization afforded to a given user and in response to user inputs. Each monitoring system 50 thus can collect and analyze the session data to calculate bandwidth usage as disclosed herein. The monitoring system 50 further can employ the aggregator 57 to correlate information globally, including from one more of the locations. For example, the aggregator 57 can be programmed to aggregate session data and/or bandwidth usage calculations from one or more specified locations within the enterprise. The aggregator 57 can store the results in the aggregation data 58.

The monitoring system 50 can also include a user interface 60 programmed to provide for human-machine interface with the monitoring system. One or more authorized user (e.g., an administrator) can employ the user interface 60 such as for setting parameters and/or initiating computations. The parameters, for example, can include a start time/date, an end time/date as well as location information. For example, the parameters can be entered via the user interface via drop-down menus, dialog boxes or other text-based and graphical elements. The user interface 60 can also be utilized to access various functions and methods implemented through the monitoring system, including an alert generator 64 and a report generator 66.

As disclosed herein, the bandwidth calculator 56 can compute a real time measure of bandwidth utilization for an ongoing media session. To facilitate such real time bandwidth utilization calculations, the session data store 54 can be configured to store records associated with ongoing communication sessions. For example, a server or switch at a given site can create a dynamic record at a beginning of each call. This dynamic record can store data in fields similar to or consistent with a full session data record as disclosed herein. The dynamic session data record thus can employ the same schema as the regular session data but be updated to capture dynamic changes in call topology or other types of bandwidth changes that might occur during a call session. It is to be appreciated that the bandwidth calculator 56 can compute such enhanced real time bandwidth utilization without having to monitor directly data flow to each of the respective switches and other hardware resources throughout the system. Thus, because session data for a media session is used instead of active or passive bandwidth monitoring of flow through hardware, the bandwidth monitoring can be considered indirect and less intrusive than other approaches.

As a further example, bandwidth of an ongoing call can change dynamically such as if a call manager for the system employs a prioritization scheme in which a given call may be downgraded to a lower priority to use less bandwidth. Additionally, if a user is experiencing low quality during a call, the system (e.g., a call manager) may identify the quality of service as being below a threshold and downgrade the codec. For multi-party calls, if a party is added with different codec capabilities, this can also effect and change the bandwidth of the communication session. As yet of a further example, bandwidth of an ongoing call can change in a fixed mobile conversion system, such as if a user transfers an ongoing call from a cellular phone to a corresponding desk phone or vice versa. Such changes and fluctuations in bandwidth can be stored dynamically within the session data 54. This dynamic session data thus can be stored at a central data store that is utilized by each site within the enterprise or it can be locally maintained at each site or in an otherwise distributed manner.

The monitoring system 50 further may include a bandwidth data manager 70 that can be utilized to control and configure the session data extractor 52 and manage the session data store 54. For example, the bandwidth data manager 70 can include an API to access the records (e.g., such as the dynamic session data as well as final session data) implemented in remote servers for each session. Additionally, after the session data has been completed and the record stored as the final session data in the data store 54, the bandwidth data manager 70 can periodically purge the dynamic data records, such as if they are maintained separately from the final session data records.

The bandwidth calculator 56 further can employ configuration data 72 as part of its computation of bandwidth utilization. The configuration data 72 can include a format bandwidth lookup table that identifies the respective bandwidth that can be utilized for each of a plurality of respective communication formats (e.g., audio codecs, video codecs, multimedia codecs and other container formats for different types of media). For example, a given codec for a media stream and number of packets can be logged as part of the session data (and temporary session data) and the number of bytes per packet for each available format can be stored as part of the configuration data 72. Further by tracking if and when a format changes during a communication session, improved accuracy in bandwidth utilization computations can result.

The alert generator 64 can be programmed to generate one or more alert messages in response to detecting bandwidth utilization exceeding one or more thresholds. The alert generator can run continuously (e.g., as a background process) or it may be initiated by a user. For example, one or more thresholds can be established for identifying excessive bandwidth utilization. Such thresholds can be set by default or be user programmable via the user interface 60. For instance, a warning level can be set to about sixty percent (60%) of an available total bandwidth and an excessive bandwidth utilization of threshold can be set to about eighty percent (80%) of the total available bandwidth. In response to the alert generator 64 detecting the bandwidth utilization (e.g., as computed by the bandwidth calculator 56) exceeding such a threshold, a corresponding alert can be generated. As mentioned above, the alert can be sent to an individual user (e.g., an administrator) or to a corresponding application such that bandwidth allocation management can be performed in real time or near real time. Additionally or alternatively, the alert generator 64 can be programmed to monitor bandwidth utilization the entire system as well as for a user selected location or set of locations, such as a site, a switch or other resources that may be located throughout the system. A level of location granularity associated with the alert can be user defined via the user interface 60.

The report generator 66 can be utilized to generate one or more reports related to bandwidth utilization. As described herein, the reports can correspond to real time reports about bandwidth utilization for the system or a user-selected location within the system. Additionally or alternatively, the reports can include historical trending of bandwidth utilization for a user-selectable period of time and/or location. The reports can include text information as well as graphical information such as disclosed herein. A user can program the parameters associated with each report that is generated via the user interface 60. As described herein, such parameters can include setting time parameters, such as a start time and an end time or requesting real time bandwidth utilization information. Parameters may also include location-specific information such as by identifying whether the bandwidth computation should be for the entire system, one or more sites within the system or for resources within a given site such as a switch or the like.

The bandwidth calculator 62 further may be available to other tools that may be used for monitoring one or more other areas of system operations. For example, an interactive topographical map of an enterprise system can be generated by an administrator tool. The tool can employ the bandwidth calculator 56 to determine bandwidth utilization for one or more locations in the map, such as in response to user interactions with the map. The resulting bandwidth computations can be displayed on the map.

Figure 3:
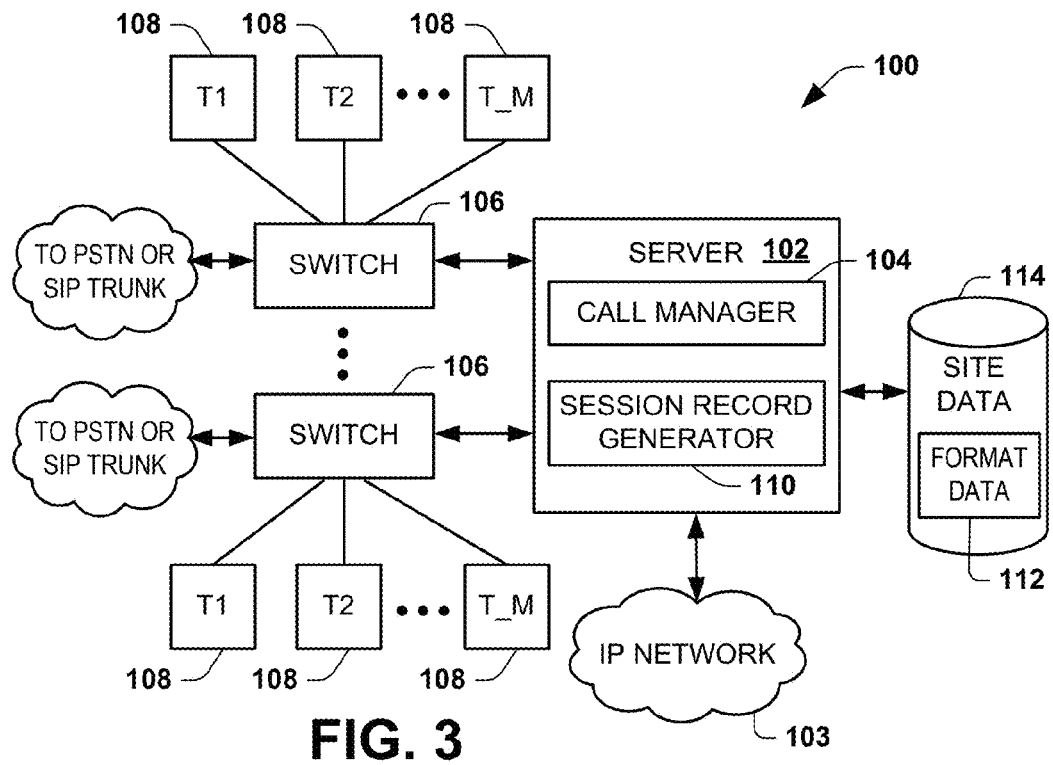
FIG. 3 depicts an example of an architecture that can be implemented for a site.

FIG. 3 depicts an example of the architecture 100 that can be implemented at a given site. By way of example, the architecture 100 can include a server 102 that is coupled to an IP network 103 such as can be a wide area network (e.g., the internet) as well as include local or proprietary networks utilized by the corresponding communication system. The server 102 can be programmed with computer executable instructions including a call manager function 104. The call manager 104 can be one or more applications programmed to support basic voice and other media call functions (e.g., call recording, integration with other applications, user interface functions, messaging, call transfers) as well as call handling functions. The call manager 104 can interface with one or more switches 106, such as to control routing and other functions. In other examples, the functionality of server 102 can be integrated into the switches 106, in whole or in part.

Each switch 106 can be configured for controlling routing of media data including various forms of media to endpoint resources. By way of example, the call manager 104 running on the server 102 can control the switches 106 such as by configuring and allocating bandwidth and selecting one or more communication formats (e.g., codecs or container formats) for each communication session. As mentioned above, in other examples, the call manager 104 can reside on the switch to perform such functions. Each switch can be coupled to the IP network 103 as well as to one or more other networks, such as to the PSTN or a SIP trunk, for example.

The server 102 can also include a session record generator 110 that is programmed to create a session record and provide session details for each respective communication session. As disclosed herein, the session record generator 110 can create a record at the beginning of each respective call that originates within or external to the site 100. The session record stores pertinent detailed information in predefined fields for the media session, such as disclosed herein. The session record generator 110 can store pertinent session data in real time during the call such as part of session data (e.g., data store 54 of FIG. 2). Additionally or alternatively, the session record generator 110 can store the session information locally during the call and then write the complete record in the session data (e.g., session data 54 of FIG. 2) after the call has been terminated. The corresponding session data can be utilized in performing bandwidth utilization computations as disclosed herein. By way of example, the session record generator can also identify location-related information for the media sessions, such as the given switch 106 through which the call passes, respective endpoint resources 108 at the site involved in the call as well as identification of additional endpoints within the site or external to the site. As disclosed herein, the site may be located within a unified communication system or endpoints can be external to the system. Information about each such endpoint can be stored as part of the session record.

The call manager 104 can employ format data 112 that can be included in a local site data store 114. The format data 112 can include a set of available codecs, container formats that can be utilized by corresponding endpoint resources at the site such as for negotiating and managing communication parameters for a given session. The format data 112 can be fixed or new formats (e.g., new codecs, types of coding or container formats) can be added such as during updates or other system changes that may be implemented. The format (s) used for a given session can also be stored as part of the session record along with time (e.g., start time, end time, duration), the number of packets and other information (e.g., encryption type and transport type), such as disclosed herein.

Figure 4:
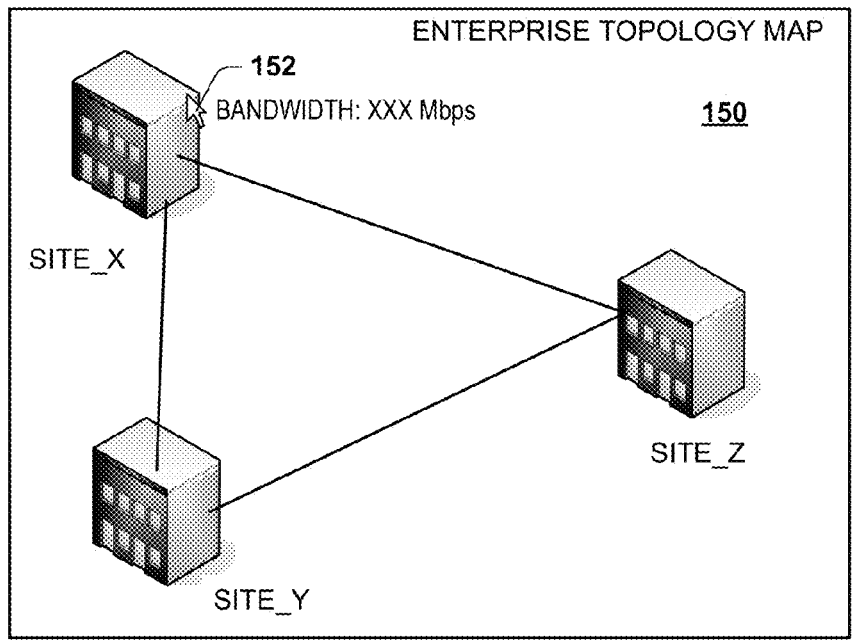
FIG. 4 depicts an example of a graphical user interface that can be utilized for monitoring system operations.

FIG. 4 depicts an example of a graphical user interface (GUI) 150 that can be implemented by a monitoring system (e.g., the monitoring system 50 of FIG. 2). In the example of FIG. 4, the GUI 150 is demonstrated for an enterprise communication system that includes a plurality of sites demonstrated at SITE_X, SITE_Y and SITE_Z. Each site can correspond to a logical group or physical location based grouping that may exist within the enterprise communication system. A user can employ a pointing device or other user input device to interact with the GUI 150. In the example of FIG. 4 a pointing user interface element 152 is positioned near or hovering over SITE_X, which results in a display of corresponding bandwidth utilization information being presented. This bandwidth can include all of the other bandwidth being utilized at SITE_X, for example. Inter-site connections for the enterprise are also demonstrated in the GUI 150. A user thus can hover the pointing element 152 over such a connection and present corresponding inter-site bandwidth usage, such as can be calculated by a bandwidth calculator as disclosed herein. The bandwidth utilization being presented can be real-time bandwidth for the selected location or connection, or the information can correspond to a historical trend during a user-selected time period.

Figure 5:
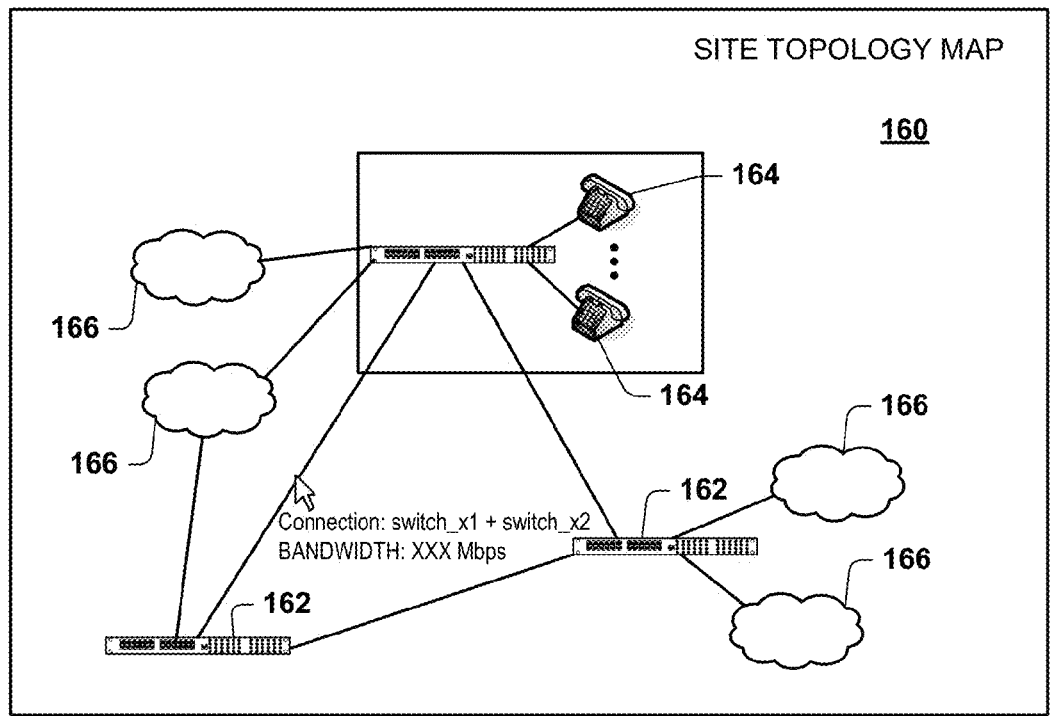
FIG. 5 depicts an example of a graphical user interface that can be utilized for monitoring site operations.

A user further may be able to drill down to more detailed resources associated with a given site or other resources. As shown in FIG. 5, an example GUI 160 for a site topology map is shown. It is to be appreciated that the topology maps of FIGS. 4 and 5 can further be utilized to show other information in addition to bandwidth usage, such as equipment status, user information or the like. In the example of FIG. 5, the GUI 160 includes a plurality of switches 162 each of which can be coupled to a plurality of endpoint devices 164. In addition each switch 162 can be coupled to each of the other respective switches as well as to PSTN or SIP trunks, demonstrated at 166. In this way, a call can originate via the PSTN or SIP trunk service or it may originate within the site at a corresponding endpoint resource 164. The user of the GUI 160 thus can hover over connections and resources within the site topology to obtain an indication of bandwidth utilization such as can be computed by a bandwidth calculator as disclosed herein. Additional functionality can be provided via drop down menus such as for selecting historical information associated with bandwidth usage.

Figure 6:
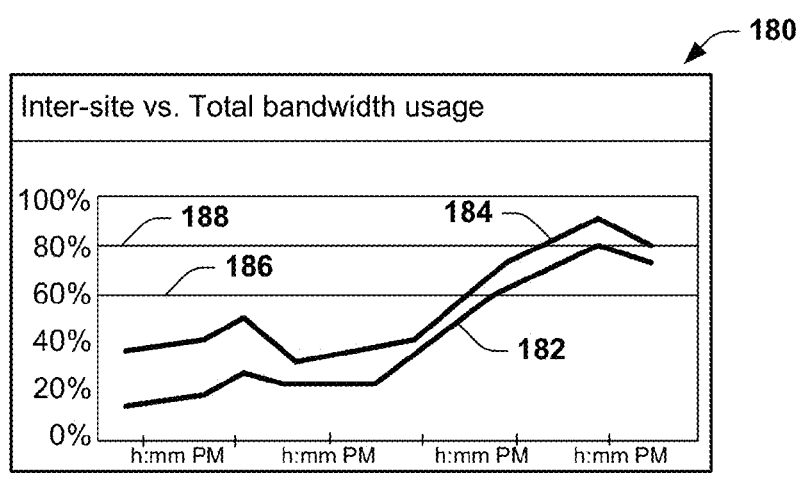
FIG. 6 depicts an example of a graph demonstrating inter-site bandwidth usage versus total system usage.

FIG. 6 depicts an example of a bandwidth usage report 180 that can be generated (e.g., via a report generator 66 of FIG. 2) demonstrating inter-site bandwidth 182 usage versus total system usage 184. In this example, the usage presented relates to a percentage of available bandwidth. Also demonstrated for additional comparison are a threshold set at 60%, indicated at 186, and another threshold at 80%, indicated at 188, of the total available usage. It is to be understood and appreciated that similar graphs can be generated by the report generator for other periods of time.

Figure 7:
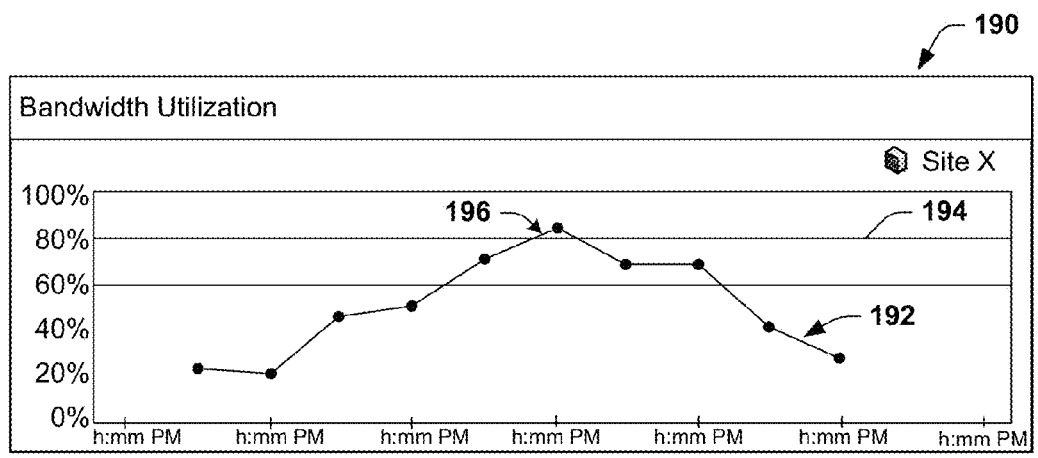
FIG. 7 depicts an example of a graph that can be provided to demonstrate bandwidth utilization for a single site.

FIG. 7 depicts an example of a bandwidth utilization report 190 demonstrating bandwidth utilization over a selected period of time for a selected site. Also demonstrated in the example of FIG. 7 is a bandwidth threshold 194 which has been exceeded, demonstrated at 196. When such a threshold 194 is exceeded, a corresponding alert may be generated (e.g., by alert generator 64 of FIG. 2).

The example of FIG. 7 demonstrates bandwidth utilization 192 for SITE_X as a percentage of total bandwidth. It is to be appreciated that an actual calculated bandwidth can be presented in the report 190. Additionally or alternatively, the report can be generated as an interactive report, such that a user can employ a GUI to drill down and obtain additional information, such as bandwidth usage for a selected resources or sets of resources within SITE_X.

Figure 8:
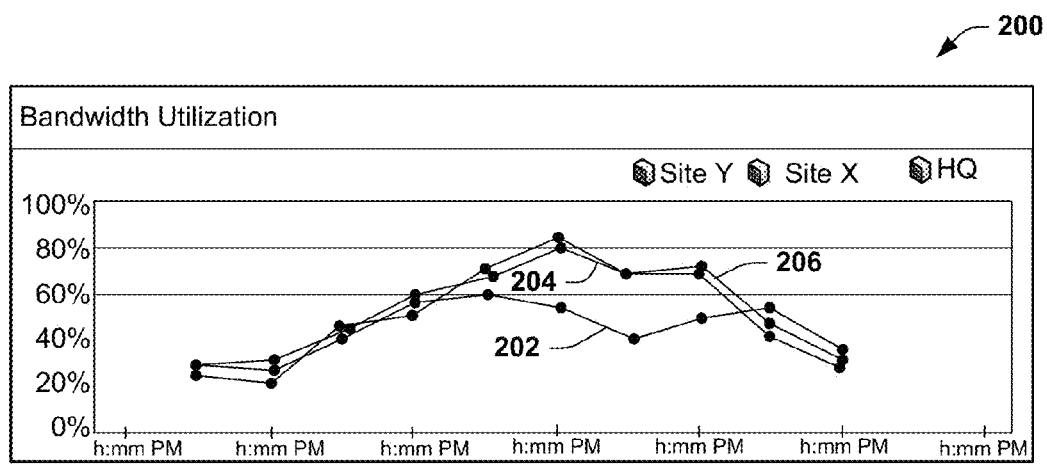
FIG. 8 depicts an example of a graph that can be provided to demonstrate bandwidth utilization for an entire system.

FIG. 8 demonstrates an example of another bandwidth utilization report 200 demonstrating bandwidth utilization 202, 204 and 206 for three sites, demonstrated respectively as SITE_X, SITE_Y and a headquarters (HQ) within a given system. Color coding or other differentiating graphics can be used to differentiate usage for the different sites. In this way a comparison of bandwidth usage at different sites can be made in a simplified manner. The available bandwidth utilization can be the same or different for different sites. The bandwidth demonstrated in the multi-site graph 200 can show the relative bandwidth utilization (e.g., out of its available percentage) for each site. As an alternative, the bandwidth utilization shown can be actual computed bandwidth utilization over the time period, for example.

Figure 9:
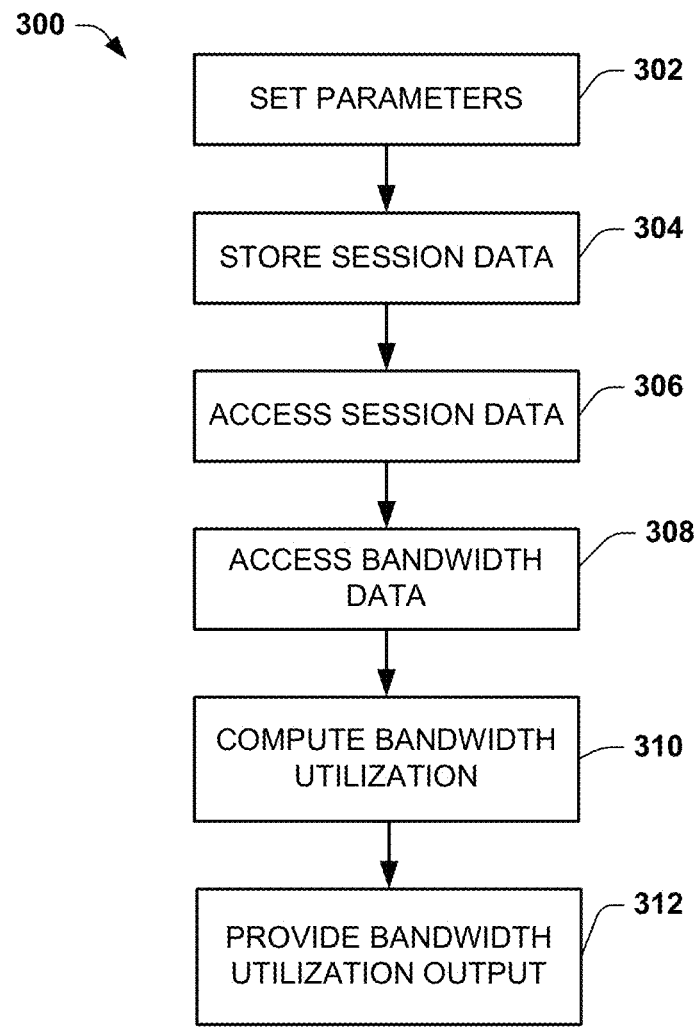
FIG. 9 is a flowchart depicting an example of a method that can be utilized for monitoring bandwidth utilization.

In view of the foregoing structural and functional features described above, an example method 300 will be better appreciated with reference to FIG. 9. While, for purposes of simplicity of explanation, the method 300 is shown and described as executing serially, it is to be understood and appreciated that the method is not limited by the illustrated order, as parts of the method could occur in different orders and/or concurrently from that shown and described herein. Such method 300 can be executed by various components configured in a computer, such as a server, or stored in memory as machine-readable instructions, for example.

FIG. 9 is a flow diagram demonstrating an example method 300 for monitoring bandwidth utilization. At 302, the method includes setting parameters for bandwidth computations. As disclosed herein, the parameters can be set by default or in response to a user input. For example, the parameters can include identifying a location, a time or a combination of locations and time constraints for which the bandwidth usage is to be computed. It is to be appreciated that a plurality of such methods can be implemented concurrently within a given system or it can be implemented as part of a monitoring system that is implemented in response to a user input.

At 304, session data is stored. The session data can include detailed accounting information associated with each respective media session such as disclosed herein. The session data can be stored in a temporary data store for a site or other location or it can be session data store for an entire system. For purposes of a bandwidth calculations, such bandwidth relevant session data can include information identifying the location or endpoints of the session, time associated with the session (e.g., start time, stop time), session format(s) (e.g., coding or other container types) utilized during the session and the like. It is to be appreciated that the session data can be stored during the call (in real time) and/or such session data may be stored after the call has been terminated.

At 306, the session data records can be accessed. The records can be accessed via a query such as based on the parameters defined at 302. At 308, the corresponding format bandwidth data can be accessed. For instance, the bandwidth data can be stored in a look-up table that includes an identification of bandwidth (e.g., bytes per packet) for a set of given types of coding that may be available, including that which has been identified in the session data accessed for 306. As described herein, the format type can be selected according to the bandwidth that was allocated by a call manager as deemed appropriate for a given communication session.

At 310, the corresponding bandwidth usage can be computed. At 312 the output of the bandwidth computation can be provided. The output can be provided to a display such as to provide an indication of the bandwidth based upon the parameters. As disclosed herein, real time bandwidth measurements can be made for the system such as in response to activation by a user of appropriate monitoring methods. Additionally or alternatively, historical trending of bandwidth utilization can be made based on user defined parameters corresponding to time as well as locations within the corresponding enterprise system. It is to be appreciated that the systems and methods disclosed herein provide an indirect mechanism that can provide an accurate measure of bandwidth utilization of various levels of granularity without injecting probes into the communication stream for a given session. Additionally, fewer resources are required than other approaches since it can be performed indirectly in the absence of measuring actual traffic flowing through resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system to monitor bandwidth utilization, comprising:
    memory to store session data that identifies an encoding type used and endpoints involved for each communication session that passes through at least a portion of a communications system;
    a bandwidth calculator executed on a device to:
        retrieve at least a portion of the session data from the memory;
        compute a measure of bandwidth utilization for at least a portion of the session data based on the encoding type and the endpoints involved, wherein the measure of bandwidth utilization is computed in the absence of measuring actual traffic flow through the at least the portion of the communications system; and
        create an output related to the measure of bandwidth utilization;
    wherein the at least the portion of the communication system comprises a plurality of sites, the bandwidth calculator is programmed to compute the measure of bandwidth utilization for at least two of the plurality of sites based on the session data, wherein the session data comprises media stream information for resources within each of the at least two of the plurality of sites, and
    wherein the session data includes an identification of an encoding type used for each media stream, the bandwidth calculator programmed to determine a bandwidth utilized by the media stream according to bandwidth mapping data retrieved by the bandwidth calculator based on the identification of the encoding type, wherein the measure of bandwidth utilization for multiple media streams being computed by the bandwidth calculator as a function of the bandwidth for each media stream.

2. The system of claim 1, further comprising an output generator to provide an output corresponding to the measure of bandwidth utilization.

3. The system of claim 1, further comprising a user interface configured to receive a user input setting at least one parameter employed by the bandwidth calculator to retrieve the at least the portion of the session data.

4. The system of claim 3, wherein the at least one parameter comprises at least one location in the communications system for which the measure of bandwidth utilization is calculated.

5. The system of claim 3, wherein the user-defined parameter comprises at least one time for which the measure of bandwidth utilization is calculated.

6. The system of claim 5, wherein the at least one time comprises a present time, such that the measure of bandwidth utilization represents a substantially real time bandwidth utilization, or a historical time period, such that the measure of bandwidth utilization represents a historical trend of bandwidth utilization.

7. The system of claim 1, further comprising an alert function to generate an alert if the measure of bandwidth utilization exceeds a corresponding threshold.

8. The system of claim 1, further comprising an aggregation data store that stores bandwidth-related data retrieved from corresponding session data for each of a plurality of media streams that pass through resources in the communications system, the bandwidth calculator computing the measure of bandwidth utilization based on the bandwidth-related data stored in the aggregation data store.

9. The system of claim 8, further comprising a bandwidth monitor programmed to access preselected fields associated with media streams stored in the session data for each of a plurality of locations and store the bandwidth-related data for each of the plurality of locations in the aggregation data store.

10. The system of claim 9, wherein each of the plurality of locations comprises a switch or a site.

11. The system of claim 1, wherein the communications system comprises a unified communications system and the measure of bandwidth utilization includes multiple forms of communication.

12. The system of claim 1, wherein the measure of bandwidth utilization is computed in the absence of inserting probe data into a communications stream through at least the portion of the communications system.

13. A method for monitoring bandwidth utilization, comprising:
   setting a parameter corresponding to at least one of a location and a time;
   retrieving a portion of session data from a data store filtered based on the parameter, wherein the session data comprises, for each media stream undertaken in a communication system, a location of at least one endpoint of the media stream within a communication system, a time of the media stream, a duration of the media stream, and an encoding type of the media stream;
   computing a measure of bandwidth utilization for the parameter based on encoding types within the portion of session data as a function of bandwidth for each media stream within the portion of session data,
   wherein the bandwidth for each media stream is calculated based on bandwidth information for each encoding type implemented by the communication system to transmit each media stream, which is determined from a bandwidth mapping table and multiplied by the duration of the media stream; and
   providing an output representing the measure of bandwidth utilization for the media stream.

14. A non-transitory computer readable medium having executable instructions that upon execution cause a computing device to execute a bandwidth calculator programmed to:
   set a parameter corresponding to at least one of a location and a time;
   retrieve a portion of session data from a data store filtered based on the parameter, wherein the session data comprises, for each media stream undertaken in a communication system, a location of at least one endpoint of the media stream within a communication system, a time of the media stream, a duration of the media stream, and an encoding type of the media stream; and
   calculate a measure of bandwidth utilization for the parameter based on encoding types within the portion of session data as a function of bandwidth for each media stream within the portion of session data as a function of bandwidth for each media stream within the portion of session data,
   wherein the bandwidth for each media stream is calculated based on bandwidth information for each encoding type implemented by the communication system to transmit each media stream, which is determined from a bandwidth mapping table and multiplied by the duration of the media stream; and
   provide an output representing the measure of bandwidth utilization for the media stream.

* * * * *